3,108,907
PROCESS OF PRESERVING SUGAR JUICES
Jose Capdevila Cucullu, 25 E. Palmita St.,
Mayaguez, Puerto Rico
No Drawing. Filed Jan. 8, 1962, Ser. No. 164,987
4 Claims. (Cl. 127—46)

This invention relates to a novel process which is extremely simple and may be very economically practiced for preserving sugar cane and sugar beet juices for processing at a future time.

More particularly, it is an object of the present invention to provide a process for preserving sugar juices which is characterized by the treatment of the juices with salicylic acid and volatile essential mustard oil.

Assuming that five hundred gallons of sugar cane or sugar beet juices are to be treated, ten grams of salicylic acid is diluted in one gallon of hot water, after which this solution is cooled or allowed to cool.

The salicylic acid and water solution, after having been cooled, is mixed with the five hundred gallons of the sugar juice. This may be accomplished in any suitable container and any conventional mixing or agitating means may be employed for effecting the mixing of the salicylic acid and water solution with the sugar juice. The mixing or agitating may be accomplished in five to ten minutes.

If the sugar juices contain large particles of the decayed matter, the mixture is filtered to remove such particles which would otherwise tend to cause fermentation. Otherwise, filtration of the mixture is not necessary.

Approximately eight hundred grams of volatile essential mustard oil is then added to the mixture, after which the receptacle containing the mixture is promptly sealed to prevent evaporation of the oil.

After only a few minutes delay the contents of the tank or receptacle may be drawn off into another storage tank in which the mixture can be stored in a sealed condition for future use. The sugar juices as thus treated may be stored for as long as four years before being processed for use.

The salicylic acid may be initially diluted in alcohol rather than hot water; however, the use of hot water is preferred since it is less expensive. Salicylic acid functions effectively to prevent fermentation and spoiling of the sugar juice and does not affect the odor or taste of the sugar juice. The amount of salicyclic acid employed, .02 gram per gallon, is not injurious to subsequent human consumption of the juice and is actually less than ten percent of the amount which may be lawfully utilized.

The mustard oil provides an effective preservative for the sugar juice and additionally functions to destroy any germs which might otherwise tend to cause spoiling or fermenting of the juices. The taste of the solution is altered slightly by the mustard oil; however, after the storage period, when the juices are finally processed for consumer use, the heat employed in such processing restores the original taste of the sugar juices.

The ratio of .02 gram of salicylic acid and 1.6 grams of mustard oil to one gallon of sugar juice may be varied to some extent; however, these proportions are considered most effective in carrying out the process.

I claim as my invention:

1. A process for preserving sugar juices comprising mixing a solution of salicylic acid and water with sugar juices in the proportion of approximately .02 gram of salicylic acid to each gallon of the sugar juice, filtering the mixture, adding volatile essential mustard oil to the mixture in approximately the proportion of 1.6 grams per gallon of the sugar juice, and sealing the mixture to prevent evaporation of the mustard oil.

2. A process of preserving sugar juices comprising mixing a solution of salicylic acid and water with sugar juices in the proportion of approximately .02 gram of salicylic acid to each gallon of the sugar juice, adding volatile essential mustard oil to the mixture in approximately the proportion of 1.6 grams per gallon of the sugar juice, and sealing the mixture to prevent evaporation of the mustard oil.

3. A process as defined by claim 2, characterized by diluting the salicylic acid in hot water and cooling the solution prior to mixing the solution with the sugar juices.

4. A process of preserving sugar juices comprising mixing a solution of salicylic acid and alcohol with sugar juices in the proportion of approximately .02 gram of salicylic acid to each gallon of the sugar juice, adding volatile essential mustard oil to the mixture in approximately the proportion of 1.6 grams per gallon of the sugar juice, and sealing the mixture to prevent evaporation of the mustard oil.

References Cited in the file of this patent

Merck Index, 7th ed., page 917, Merck & Company, Inc., Rahway, N.J. (1960). (Copy in Div. 43.)

Chem. Abstracts, vol. 53, page 22582b, 1959. (Copy in POSL.)

Chem. Abstracts, vol. 53, page 11512a, 1959. (Copy in POSL.)